A. E. BLASHILL.
WIRE FABRIC MACHINE.
APPLICATION FILED SEPT. 28, 1915. RENEWED MAR. 2, 1922.

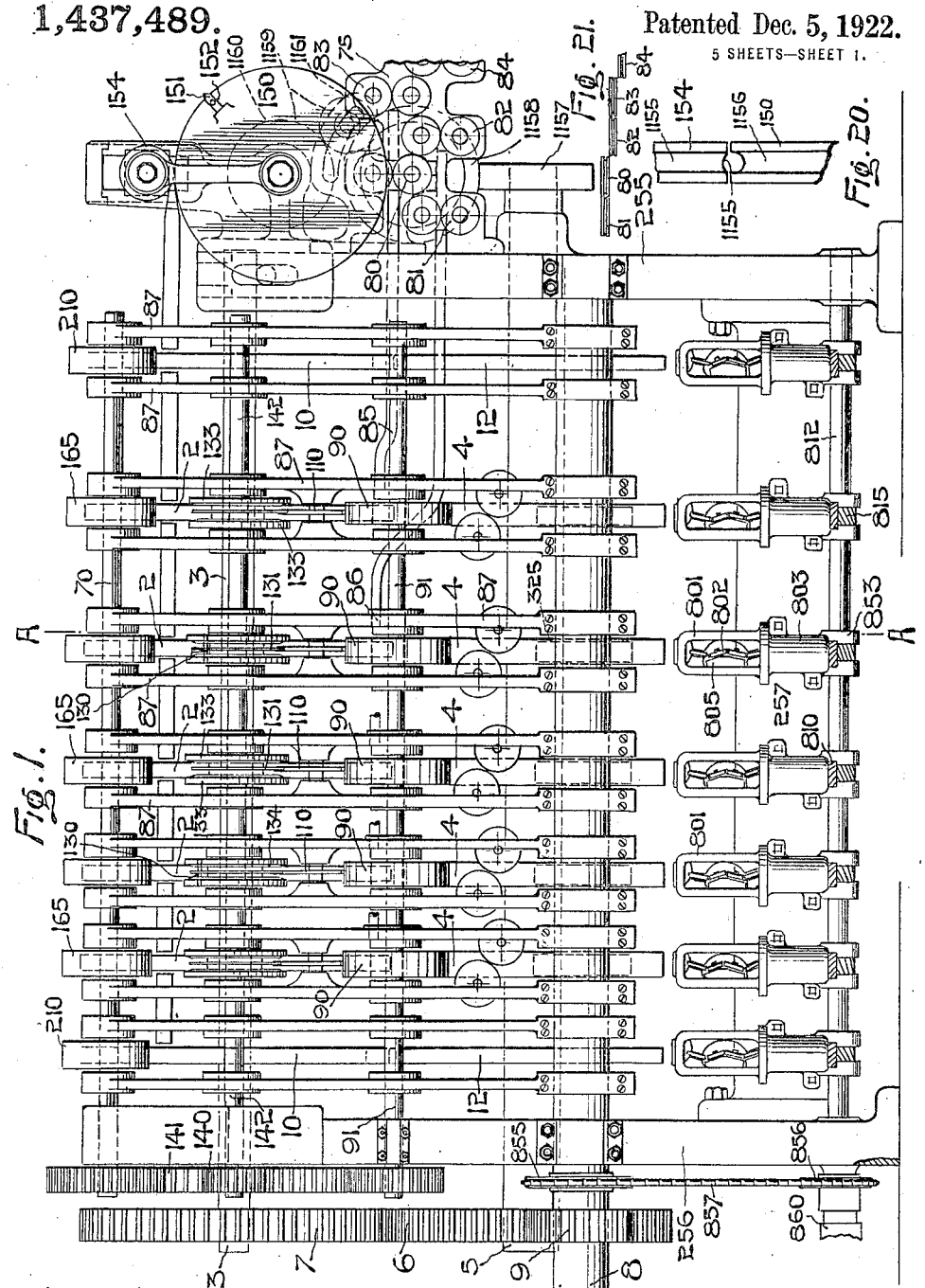

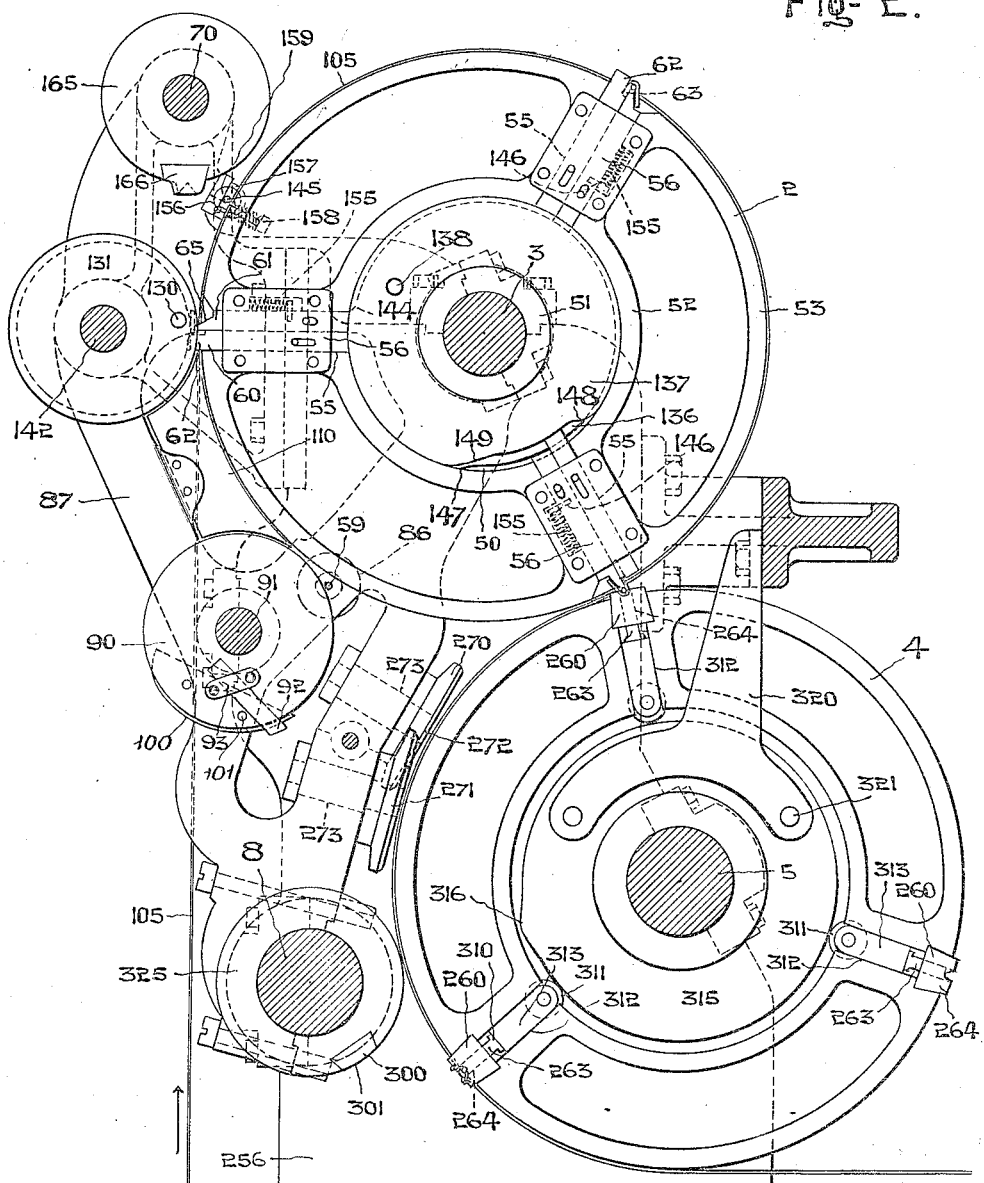

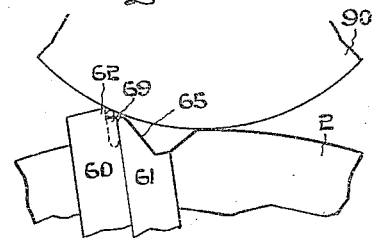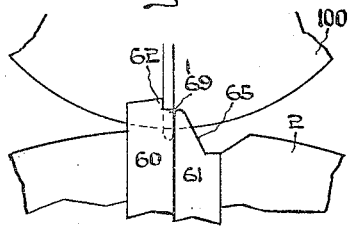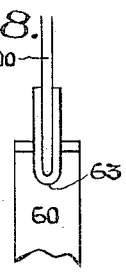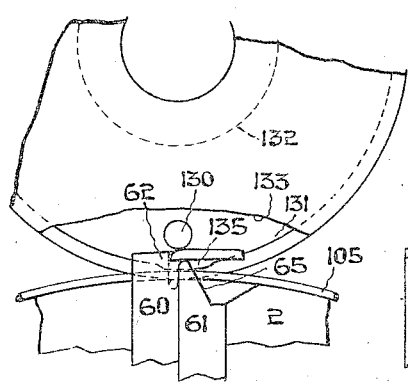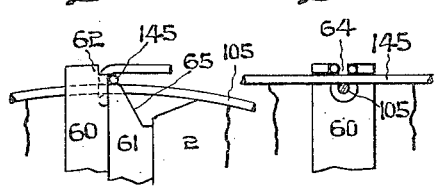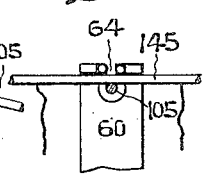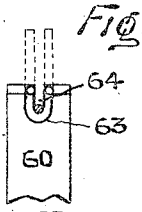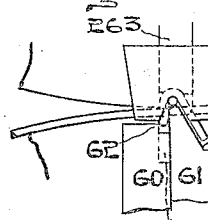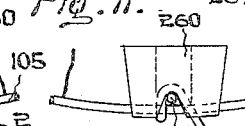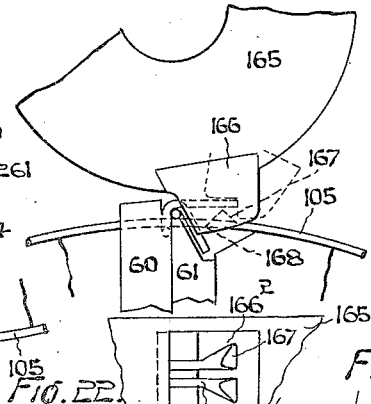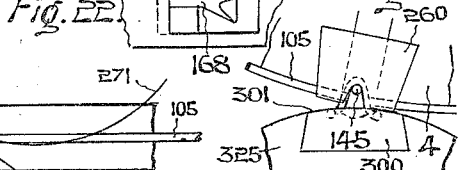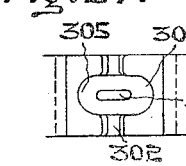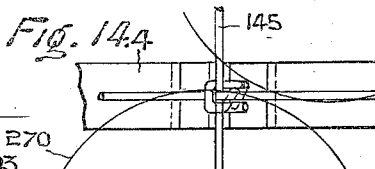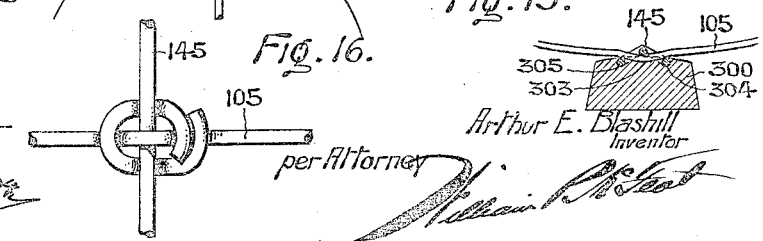

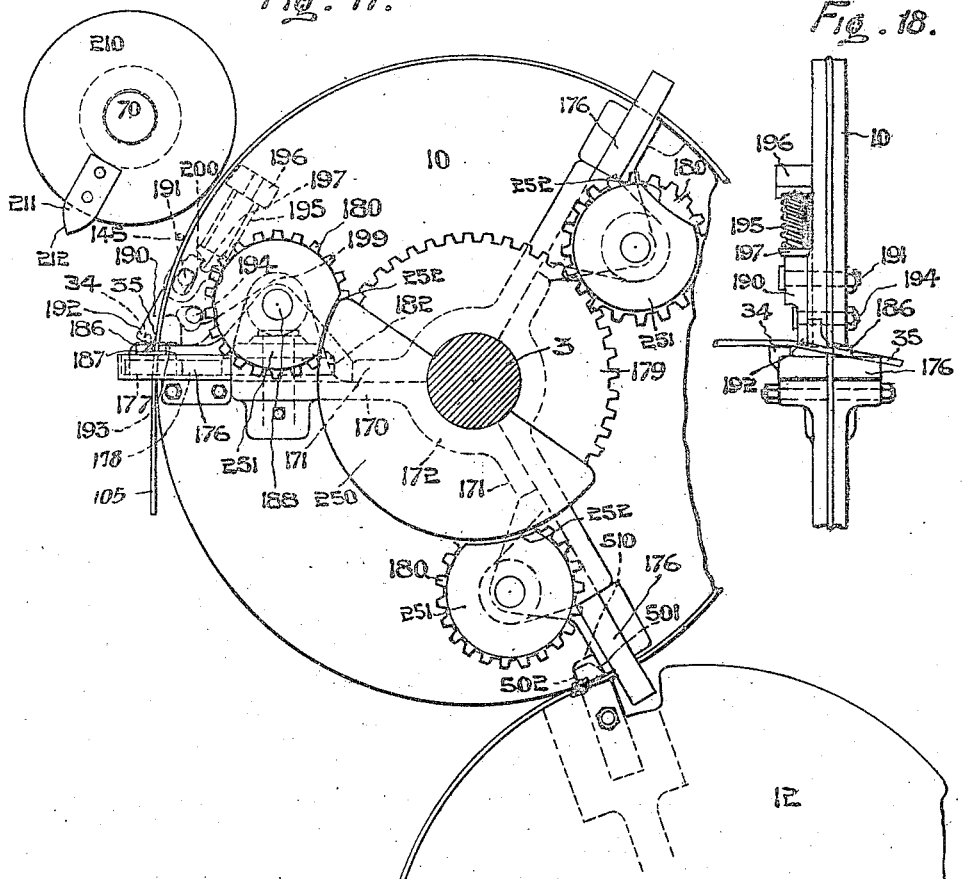

1,437,489.

Patented Dec. 5, 1922.

Witnesses:

Arthur E. Blashill
Inventor per Attorney

Patented Dec. 5, 1922.

1,437,489

UNITED STATES PATENT OFFICE.

ARTHUR E. BLASHILL, OF WESTMOUNT, QUEBEC, CANADA.

WIRE-FABRIC MACHINE.

Application filed September 28, 1915, Serial No. 53,105. Renewed March 2, 1922. Serial No. 540,665.

(GRANTED UNDER THE PROVISIONS OF THE ACT OF MARCH 3, 1921, 41 STAT. L., 1313.)

*To all whom it may concern:*

Be it known that I, ARTHUR E. BLASHILL, a subject of the King of Great Britain, residing at the city of Westmount, in the Province of Quebec, Dominion of Canada, have invented certain new and useful Improvements in Wire-Fabric Machines; and I do hereby declare that the following is a full, clear, and exact description of the same.

My invention relates particularly to machines for making wire fabric, useful more particularly for fence construction; and it has for its object to provide a machine which will produce fabric of this type continuously, no intermission or interval of rest being necessary for any of the several operations in the process of manufacture. There are many kinds of wire fabric suitable for fence construction, and one of the most widely known is the "staple-lock" fabric in which staples engage the intersections of the strands and stay-wires and, when their legs are bent, lock these strands and stay-wires rigidly together. It is to the manufacture of this particular fabric that my present invention relates, and the machine I have devised produces the finished fabric with a uniform and uninterrupted delivery thereof ready for use.

The invention may be said briefly to consist of a machine designed and constructed on the rotary principle, that is to say practically all the work is produced by means moving in a circle to perform the functions direct or in connection with fixed parts.

The object of my invention is to provide a machine of this type which will have continuous operation and the rate of production and efficiency of which will be higher than that of the machines for this purpose at present known. To this end the invention may be said, broadly, to consist of a machine built essentially on the rotary principle, and consisting of a series of continuously rotating work-rolls, or more specifically stated, a series of pairs of such work-rolls carrying means operated successively in conjunction with mechanisms independently carried, to cut successive blanks from a continuously fed stock, then by successive operations form the blanks into locks locking together the strands and stay-wires of the fabric, practically the entire series or cycle of operations being performed during each revolution of each pair of work-rolls.

As before stated my present machine is for the manufacture of wire fabric for use more particularly in the construction of fences, but, nevertheless, fabrics for other uses may be manufactured by varying certain parts of the machine, and, thereby, the relation of the fabric elements, without departing from the spirit of my invention, thus producing fabric for the reinforcement of concrete work, or other uses.

The machine has as essentials the series of pairs of work-rolls before mentioned and secondary rolls arranged in different angular positions around certain co-acting parts on the work rolls in the formation of the locks and the connection of the ends of the stays to the marginal strands; a series of the pairs of work-rolls being provided. In addition to the main and secondary rolls there are means for feeding lock wire, strands and stay wires to the work-rolls, the strands being caused to run through the machine continuously and at a constant speed, and they are maintained in fixed relation with the work-rolls, that is to say the paths followed by the strands are so located, a lock wire being fed to each of the work-rolls, excepting these coinciding with the margins of the fabric, the lock blanks being cut therefrom successively. These lock blanks are, immediately after being cut, partially formed into locks and brought into engagement with strands. The stay-wires are then fed across the series of work-rolls and stays of the required length are cut therefrom and located in intersection with the strands without interrupting the constancy of the progress of the strands. After this stage in the operation the locks are completed, each being formed to embrace a strand and stay-wire. The fabric, as it is completed, is wound into bundles, and a feature of this invention is overcoming the unevenness in the tension, thereby helping to secure a uniform length of strand, and securing a uniformly wound bundle. An important feature of the lock-forming mechanism is that less wire is required for the lock than formerly.

The pairs of work-rolls are disposed in horizontal series with one roll of each pair higher than the other, and both slightly below the level of the face of an operator of average height, the rolls being furnished with tools, and all the secondary rolls and tools or instrumentalities co-acting with them are located at the side of the work-rolls towards the operator, thus bringing all the operations within his view. The upper rolls with their co-acting secondary rolls and mechanisms form the locks in place attaching the strands and stay-wires together, thereby assembling the fabric; and the lower rolls with their co-acting secondary rolls and mechanisms complete the fabric by closing the locks.

For full comprehension, however, of my invention reference must be had to the accompanying drawings forming a part of this specification in which similar reference characters indicate the same parts, and wherein:

Figure 1 is a front elevation of a machine constructed according to my invention;

Fig. 2 is a transverse vertical sectional view taken on line A—A Fig. 1;

Figs. 3, 4, 5, 6, 7, 8, 9, 10, 11, 12, 13, 14 and 15 are enlarged detail views of the staple lock in its various stages of formation and the mechanisms which successively act upon the lock;

Fig. 16 is an enlarged detail view of the complete lock;

Fig. 17 is an enlarged detail side elevation of the rolls carrying the twisting mechanism;

Fig. 18 is a front elevation of a portion of the upper roll carrying a part of the twisting mechanism;

Fig. 19 is a plan view of the housing containing the twisting gears and the mechanism for driving the same;

Fig. 20 is an enlarged detail side elevation of a portion of the stay-wire feed-rolls illustrating particularly the circumferential grooves therein;

Fig. 21 is a plan view of the lock wire feed rolls illustrating particularly their relative positions;

Fig. 22, 23 and 24 are face views of the dies illustrated, respectively, in Figs. 10, 11 and 15;

Figure 24A:
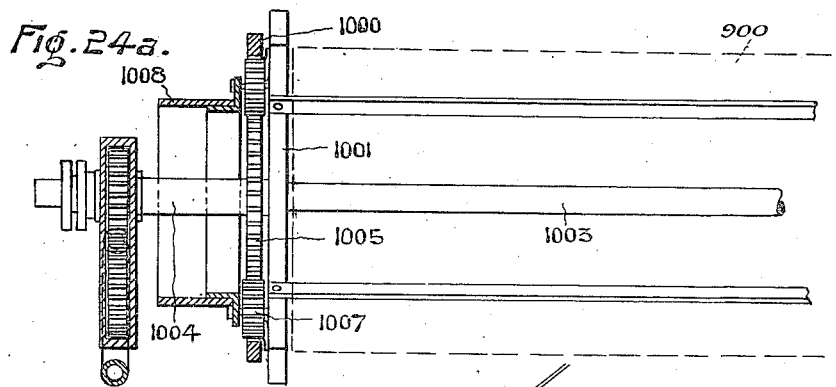
Figure 25:
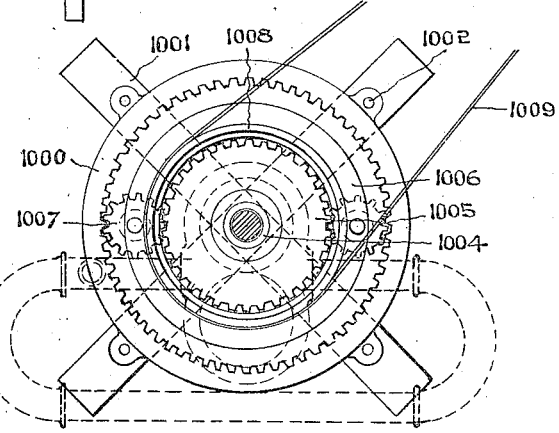
Figure 26:
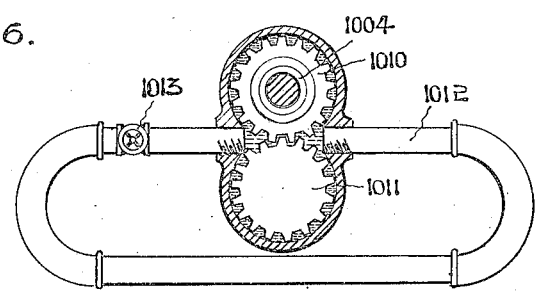

Fig. 24$^a$ is a front elevation of the roll for receiving the complete fabric illustrating the governing device therefor and brake in section;

Fig. 25 is an end elevation of the roll, illustrating particularly the governing device carried thereby; and Fig. 26 is a side elevation of the brake partly in section.

The fabric-assembling rolls are indicated by the reference numeral 2, and they are mounted rigidly on a shaft 3 and spaced according to the width desired between the strands; and the lock-finishing rolls 4 are correspondingly spaced and mounted rigidly on a shaft 5, the shafts being mounted in the machine frame and connected by intermeshing gears 6 and 7 to run at the same circumferential speed. The power is transmitted from a shaft 8 through gear 9 to the gear 6 on shaft 5. The end rolls indicated at 10 and 12 (one pair at each end of the machine and consequently at what will be the top and bottom of the fence) are different from the intermediate rolls in that they are designed to twist the ends of the stay wires around the top and bottom or marginal strands. The uppermost end roll 10 of each pair is mounted rigidly on shaft 3, and the lowermost 12 on shaft 5, and the rolls at one end correspond precisely with those at the other, the intermediate rolls being also all precisely the same.

I will first describe the work-rolls and their co-acting secondary rolls and mechanisms, then the mechanisms for feeding the strands, lock-wire and stay-wire, and finally the wind-up means.

The fabric-assembling rolls 2, being the same in all respects, each has an annular chamber 50 formed by the hub 51 and a surrounding flange or wall 52, the rim 53 being also in the form of a flange from which, and the flange 52 and the hub, the web is offset. The chamber thus formed between the flanges 52 and 53 is for the purpose of reducing the weight, while the off-set web affords material in which are cut a series of radial ways 55 for the tools by which the lock is partially formed. These ways are equal in depth to the width of the rim, and a plate 56 covers each way.

The tools (Figs. 2, 3, 4, 5, 7, 10, 12) consist of a pair of slide bars 60 and 61 respectively. The tool 60 picks up the lock-blank and constitutes part of the means whereby it is formed into a staple, retains the staple and sustains the pressure while further work is being done. The blank is picked up by a projecting lip 62 formed by a rabbet presenting a shoulder 69 and it is received into and retained by a chamber 63 covered by the sliding tool 61; a vertical slot 64 extending inwardly from the end of the tool back to within a short distance of the inner end of the chamber. The staple is forced into this chamber by a tool, to be presently described, which is guided in the slot 64.

The tool 61 has its operating end beveled at its forward side, relatively to the direction of rotation of the roll, to present a tapered anvil 65 having its rear side flat to lie flush upon the tool 60. This tool 61 is operated to lie at different times with the nose of the anvil alternately flush with the shoulder and a sufficient distance inward from it to provide space to accommodate the stay.

The means for feeding the lock-wire, indicated at 59, comprises feed rolls for feeding a group of wires horizontally and at substantially right angles to the rolls 2 and 4 relatively arranged to feed the wires in close order and in or parallel to the line in which the blanks are cut, further devices being provided to deflect them from their lines of feed to the lines in which they are cut. The feed rolls may be of any well-known type suitable for the purpose. They are mounted in a bracket 75 (Fig. 1) in which they are disposed in staggered relation in side elevation and oblique series in plan view. These feed rolls are, of course, arranged in pairs, and in my machine the pairs are disposed vertically. In order to group the wires in the smallest possible space for the purpose above mentioned and to attain the required result, I arrange one pair, 80, to supply the first pair of rolls 2 and 4. The next pair of feed-rolls 81 serve the second pair of rolls 2 and 4 and being arranged at a lower level but in the same vertical plane, and the succeeding pairs 82 and 83 are at the same level as the respective pairs 81 and 80 but offset progressively horizontally; the pair 84 being at the same level as 81 and 82 and further offset horizontally. One roller of each pair, the top and bottom roller alternately, is arranged in slightly vertically staggered relation as shown in Figure 1 in order to avoid interference with the wires by the pairs of rollers next to them. The carrying bracket 75 is bolted to the end 255 of the machine frame. The lock wires 59 are guided from the feed rollers to the work-rolls 2 and 4 through tubes 85 attached to any convenient part of the machine and communicating with hardened bushings 86 set in brackets 87. The tubes deflect the wires from the feed rollers to the bushings which are located with their openings at the points where the lock-blanks are cut. The lock-blanks are cut from the wires 59 by cutting mechanism comprising a relatively heavy roll 90 mounted rigidly on a shaft 91 and having the cutting tool 92 countersunk in one side and disposed tangentially to the shaft and protruding slightly beyond the perimeter of its roll, the tool being held in place by clamping plate 93. This cutting-roll shaft 91 is located on a level practically midway between the shafts 3 and 5 and in position to place the adjacent side of its perimeter with its pitch line in juxtaposition with the pitch line of roll 2. This roll 90 has a segmental plate 100 inserted therein in the same vertical plane as the slot 64 in the tool 60 and it is fastened rigidly in place by pins 101. The blank is cut by the shearing action of the cutting tool with the end of the bushing, and the plate 100 coacts with the slot 64 and recess 63 and with them constitutes the means whereby the blank is formed into a staple.

As before mentioned the strand wires indicated at 105 run through the machine continuously, and this is effected by means which draw them with uniform tension. They pass upwardly, one at the side of each of the rolls 90, and are looped over the respective pairs of rolls 2 and 4 and run thence to the wind-up mechanism which will be presently specifically described.

Immediately after the staple is formed it is brought into engagement with the strand wire and in order to prevent it slipping from chamber 63 before it reaches the wire, a guide plate 110 is encountered and straddled by the staple.

Immediately after the staple engages the strand wire its legs are bent at right angles as shown in Figs. 5 and 7. This operation is performed by a revolving pin 130 adapted to move at double the speed of the staple. It is carried by a roll 131 of annular form mounted rigidly on a hub 132 having formed integrally therewith a pair of disks 133 located at opposite sides of the roll and having their adjacent faces provided with inwardly-facing beveled annular guides 134, the purpose of which is to maintain the staple in its proper position relatively to the strand, to have its legs bent, and while being bent, as the staple straddles the roll 131 during this period of the cycle, the legs are prevented from being distorted inwardly. The pin 130 is carried in the roll and disks, and extends across the spaces between them on each side of the roll. It is thus in position to engage the staple legs. In order to prevent displacement of the strand and staple and retain the head of the staple in its chamber 63 while the legs of the staple are being bent, the roll 131 has a rise presenting a bearing surface 135 extending along the portion of the roll radially opposite to and on each side of the radial line of the pin and extending beyond the radial line intersected by the forward side of the pin. This rise is timed to bear firmly upon the strand and retain it against roll 2 thereby momentarily preventing displacement of the strand and through it keeping the head of the staple in its chamber while the pin is performing its function. The means for rotating roll 131 is a pair of gears 140, 141, the latter being mounted on shaft 3 and the former on a shaft 142 which carries the roll 131. Immediately after the staple legs are hooked the tool 61 is withdrawn to afford clearance for the stay.

A stay is picked up by the staples and a lifting table 34 (Figs. 17, 18, 19) carried by a part of the devices for twisting the end of the stay around the marginal strands; but before describing the structural feature which do this picking-up and twisting of the ends, I will set forth the means for feeding and guiding the stay wires and cutting off the stays. The stay-wire indicated at 145 is fed across the faces of the series of rolls 2 from its original coil by a measuring feed-roll 150 (Fig. 1) equal in circumferential length to the length of the stay, which length is cut by a cutting tool 151 countersunk in the feed-roll and fastened in place by a screw 152. The companion feed-roll 154 is flat excepting for a shallow circumferential groove 1155 for the wire and the main feed-roll has a relatively deeper groove 1156 also for the wire which is fed in direct horizontal line from the top of the main-feed roll 150 through a guide to its position across the faces of the rolls 2. This guide is divided into a series of sections carried by the brackets 87 and extending between the rolls 2, the wire being exposed between the ends of the guide sections and across the rolls. Each guide section is secured at its opposite ends to a pair of the brackets, and consists of a pair of jaws, (Fig. 2) one, 156, fastened to the brackets and having hinged thereto a movable jaw 157, retained closed by a spring 158; one end of each guide section being flared as at 159 to facilitate the entrance of the stay-wire. The roll 150 is driven from shaft 5 by a train of gears 1157, 1158, 1159, and 1160, the gear 1158 being adjustable and carried, for the purpose, in a bracket, 1161 (see Fig. 1).

The stay is cut by the cutting tool 151 acting through it against the roll 154, and immediately following the cutting action, it is picked up by the hooked staples and the lifting tables 34 to be presently described. Before the ends of the stay are twisted around the marginal strands a holding device for the stay-ends is brought into action, and simultaneously the legs of the staples are bent to inward positions and with the cooperation of the tools 60 and 61, retain the stay in position on the strands. This further bending of the staple-legs is effected by a roll 165 mounted on a shaft 70 moving with the same peripheral speed as roll 2 and having inserted therein a radial female die 166 (Figs. 2 and 10) dovetailed in place, with a protruding end adapted to act upon the staple legs. This protruding end has therein a pair of matrices to receive the legs and correct any faulty relative positions they may have. The matrices have their forward ends (those encountered by the legs) comparatively wide and the matrices themselves are in plan view tapered to parallel circumferential grooves, (see Fig. 22) the inner walls or bottoms of the matrices being of irregular contour and presenting an abutment face 167 and a rise or tooth 168 adapted to intermesh with the nose of the anvil 65 and bend the staple-legs down flush upon the anvil. The result is shown in Fig. 10.

When the formation of the staple lock has progressed thus far, the ends are held on the twisting devices, which, as before mentioned, have coacted with the hooked staples in picking up the stay, and I will now describe these twisters.

The end rolls 10 carry the twisting mechanism, and for illustration thereof reference should be had to Figs. 17, 18, and 19.

Each roll 10 preferably consists of three equal sectors united along their radii by a flange 170 at one side extending the full length of the radius, and a short flange 171 both merging into a hub flange 172, the flanges 170 and 171 being bolted together. The flange 170 has bolted thereon near its outer end a twister gear housing 176 containing a pair of intermeshing gears 177, 178, the latter being driven by a train of gears 179, 180, 181 and 182, the gear 179 being centered upon shaft 3 and held in fixed position by being bolted to the frame of the machine, or otherwise anchored, this particular means not being shown. This gear 179 is of segmental form. Rotation is imparted to the gears 180, 181 and 182 and from the latter to 178 and 177 by the rotation of the roll 10 with the shaft 3 to which its sectors are clamped.

The gear 177 is the twister-gear and it has a radial slot 185 between two of its teeth and a hook 186 on its top and protruding above the housing, the engaging face 187 of the hook being grooved to engage the end of the stay-wire indicated at 35; clearance space for the housing and stub shaft 188 on which the gear 181 is mounted being provided by cutting away a portion of one side of the adjoining sector. During the rotation of the work-rolls the stay-wire is picked up, as before mentioned, and after being picked up and before the twisting action begins the stay ends are held down upon the protruding top of the gear 177, which top constitutes a work-table.

The lifting-table 34 is preferably cast as an integral part of the housing and its lifting surface is located at a sufficient distance from the center of twisting gear 177 and a sufficient distance above the work-table presented by the top of this gear to provide necessary clearance for the stay-end to pass beneath when the twisting is commenced.

The holding device is in the form of a presser foot consisting of a member 190 (Figures 17 and 18) pivoted upon a pin 191 fixed in the roll 10 and presenting a toe 192 with its lower surface 193 formed substantially concentrically with the pin 191 when the presser foot is depressed; a further pivotal connection between this member and the roll being effected by a pin 194, and the member itself is slotted as at 200 in a line extending between the surface 193 and the pin 191 to permit vertical movement of the member, which movement is resisted by a spring 195 bearing between a bracket 196 and a knuckle 197 pivotally engaging the upper end of the member. A second slot 199 extending radially outwards and circumferentially from pin 194 permits the member to turn on the pin 191, and both slots permit the member to be raised against the pressure of spring 195. This movement is also yieldingly resisted by the spring 195 and the member is returned to its normal position with its toe protruding as shown in Fig. 18 and resting in close proximity to the top gear of 177. The function of this presser foot is to maintain the end of the stay-wire in bearing relation with the table presented by the top of gear 177 during the twisting operation, the presser foot rising as the wrapped portion of the stay-wire end increases in length along the strand. When the stay-wire end has been picked up by the twister it rests on the top of the hook 186 and in order to force it into the hook to permit the twister to act upon it, it is displaced from the top of it by a finger 211, a roll 210 being mounted upon shaft 70 (the same as roll 165 is mounted upon it), and the finger 211 is inserted therein with one end protruding and presenting a substantially cycloidal face 212. This protruding end inserts itself above the hook 186 and forces the stay-wire inwardly over the top edge of the latter, and causes it to drop into the hook, thus inclining the stay-end, and giving to it a helical lead which facilitates the operation of twisting.

The continued rotation of the work-rolls brings the mechanism for operating the twister into action. This is caused by a train of gears 179, 180, 181 and 182, the gear 179 being a semi-gear and fastened to the end frame 255 of the machine. The twister at the opposite side of the machine is operated by a similar semi-gear fastened to an end frame 256, and the balance of each semi-gear consists of a cam 250 for coacting with a disk 251 having a concavity 252 concentric with the cam when in locking position. This disk is mounted rigidly upon shaft 188, and the effect of the engagement is the locking of gear 180 and the balance of the train against rotation when they are out of mesh with gear 179. The twisters are operated during 180 degrees of the rotation of the work-rolls.

Immediately after the twisting is finished, the partially completed wire fabric is transferred to roll 4, after which the staple legs are folded in to form the lock and the lock is compressed and the strand and stay engaged and thereby simultaneously crimped, thus finishing the fabric. This compressing of the lock and simultaneous crimping of the strand and stay during the manipulation of the fabric is an important feature of my machine, and these operations and the detail mechanism are illustrated in Figs. 2, 13 and 15. At this stage of the operation (when the twisters have performed their function) the locking staple has assumed the position shown in Fig. 12, with its legs projecting into roll 2. When transferred to roll 4 (Fig. 11) it is received in a matrix 260 dovetailed in roll 4 with its matrix face protruding. The matrix face has a groove 261 extending across the same in a circumferential line and a cross slot 262, of sufficient depth to receive the head of the staple and the stay-wire when the strand is lying in the bottom of the groove 261; and a plunger 263 is slidably carried in a central opening 264 in the matrix and extends completely through the same in a radial direction. The transfer of the web places the partially finished lock in the matrix 260 in the manner just described and simultaneously with the transfer of the locks and the strands and stay-wires locked together thereby, the marginal strands and the ends of the stay-wires twisted around the same are of course also transferred, and the latter are automatically stretched under comparatively heavy tension. This is effected by a cycloidal tool carried by the roll 12 mounted on shaft 5 and consequently driven at the same peripheral speed as roll 4. The tool has a protruding end presenting a cycloidal face 501 opposite to its direction of rotation and a beveled bearing face 502 doing the stretching, the other face being of cycloidal contour for the purpose of affording clearance for the stay, with minimum loss to the bearing surface 502. When the transfer is being effected this tool intermeshes with the roll 10 and to accommodate it the latter roll is formed with a chamber 510 intersecting the strand groove in the roll and extending into the groove to about midway its width. The tool is arranged to have its bearing face 502 graze the strand-side of the chamber when intermeshing.

As the rotation continues the matrix 260 and the tools 60 and 61 separate, and the legs of the staple project completely from the matrix as shown in Figs. 11 and 12 and they are folded across the strand and made to lie beside one another tightly clasping the strand, by folding devices encountered almost immediately after the fabric has been transferred. These folding devices consist of a pair of rollers 270 and 271 mounted in the brackets 87 and disposed one ahead of or above the other and in position at opposite sides of the path of the strand and so disposed as to slightly overlie the strand-wire. These rollers are flat with their edges beveled as at 272 and they are mounted on shafts 273 rotatably carried in the brackets and adapted to freely rotate; but they are not driven, except by the friction of the staple legs as they impinge thereon. This relation of these rolls and the stay-wire and staple is clearly illustrated in Figs. 2 and 14. As the rotation of roll 4 proceeds the one leg of the staple is brought into contact with roller 270 and caused by it to be folded over the strand to the position shown in dotted lines in Fig. 14; and the further progression brings the other leg into engagement with roller 271 which folds it to the left. After these leg-folding devices have performed their functions, the simultaneous compression of the lock and crimping of the strand and stay-wire takes place. This is effected by a matrix 300 coacting with the plunger 263. The matrix has a convex face 301 formed with a cross slot 302 adapted to receive the stay-wire, and slot 303 to receive the portion of the strand beneath the stay-wire, and recesses 305 and 304 which are of sufficient dimensions at 305 to accommodate the head of the staple and at 304 the folded legs when in their proper relative positions as shown in Fig. 16. Plunger 263 has its head 310 located in a slideway 312 in roll 4 in which slideway a plunger 313 having a trundle roll 311 at its inner end, is slidably mounted. This roll 4 has a central chamber in which is located a cam 315 having a rise 316, the cam being held against rotation by an arm 320 fastened to the cam by screws or bolts indicated at 321. The matrix 300 is carried in a roll 325 mounted on shaft 8 and it is driven at a surface speed equaling that of roll 4. As the rolls rotate the folded legs of the staple at one side of the stay-wire and ahead of the staple at the other side are gradually spread apart by the matrix along which the head and legs of the staple are forced to travel; the gradual action being obtained by the rolling action of the matrix face 301 combined with the action of plunger 263 which gradually straightens the irregularly folded legs from their position shown in the dotted lines in Figs. 13 and 14 to the position shown in Figs. 15 and 16, this rearrangement being caused by the recess 304 and the gradual creeping of the compressive force over the face of the matrix from the entrance of recess 304 to a point in radial line with the stay-wire. Just before reaching this point the trundle roll 311 on plunger 313 commences to ride upon cam 316 and the maximum pressure is obtained by the trundle-roll reaching the top of the rise simultaneously with the stay intersecting a line uniting the center of shafts 5 and 8. This compressive action has the effect of crimping the intersecting portions of the strands and stays, the purpose being to securely fix the parts against relative displacement.

Each strand is made to pass through a combined coiler and tension device before passing to the work rolls. Each of these devices consists of a spindle having a vertically elongated head 801 of well known construction. This spindle is mounted in a sleeve-bearing 803 fastened to the lower beam 257 of the machine. The top and bottom rollers are mounted directly in the head 801, and the intermediate rollers on a swivel plate 805 adapted to be swung to a position at right angles to the head and thus place the intermediate rollers in position with the space therebetween in alinement with the axis of the spindle. This permits the wire to be readily threaded therethrough. A latch-pin (not shown) yieldingly retains the plate in its proper operating position. There are a series of these coilers, and the spindle of each has a spiral gear 810 mounted rigidly thereon; and the spindles of the several coilers are caused to operate in unison by a shaft 812 having spiral gears 815 intermeshing with the gears 810. The shaft 812 is driven by a sprocket wheel 856 mounted on a clutch 860 and in turn driven by a sprocket wheel and chain 855 and 857 respectively, the wheel 855 being rigidly mounted on driving shaft 8. The necessary tensional effect to take all slack out of wire before reaching the lock formers, for the purpose of insuring uniformity of length of the strands, is secured by the resistance of the coiler members to the passage therethrough of the strand wires. Without this application of tension the respective wires would have different degrees of slackness and consequently they would be of different lengths. The coilers are automatic in their action, in that their operation depends solely upon the formation of their parts which take movement from the wires as they are pulled therethrough by the work-rolls and wind-up mechanism. The work done by the coiler-parts imparts spiral form to the strands; and the uniform speed of travel of the strands through the machine facilitates the operation of these coilers.

Heretofore there has been considerable disadvantage experienced in collecting the woven fabric as it left the machine, owing to the fact that the winding up or rolling of the fabric was of necessity done intermittently. Another disadvantage was experienced from the increasing diameter of the roll while being wound. These disadvantages are overcome in my present machine by wind-up means embodying a governing device rendering the wind-up or take-up action constant in speed and tension. To this end the wind-up mechanism consists of a drum 900 extending the full length of the machine and located on the floor behind it. Power is imparted to the drum by any preferred means from shaft 8, and in order to exert a uniform tension upon the fabric traveling through the machine, the governing device just mentioned is provided. This governing device consists of the following mechanism. An internal gear wheel 1000 is fastentd rigidly to the drum or reel 1001 by screws 1002 or other suitable means, the reel being rotatably mounted on a shaft 1003 supported in suitable bearings. A sleeve 1004 rotatably carried on this shaft has a spur-gear 1005 upon one end thereof and located within the internal gear 1000; and an annulus 1006 is located between the internal and spur gears and carries a pair of diametrically oppositely arranged pinions 1007 intermeshing with both gears. The annulus is an integral part of a driving pulley 1008 driven from a countershaft (not shown) by a belt 1009. In order to provide a regulable resistance to the rotation of the spur gear 1005 the sleeve 1004 is rigidly connected to one of the gears 1010 of a rotary pump comprising, as is well known, a pair of intermeshing gears 1010, 1011 and a duct 1012 controlled by a valve 1013.

The operation of this governor is entirely automatic. At the commencement of the bundle, the wind-up drum, the pulley and the gears 1000, 1005 and 1007 rotate about the common axis 1003 all at about the same speed; but as the circumference of the bundle increases with continued winding its speed of rotation must decrease owing to the fact that the fabric is delivered at a constant speed. As the speed of the drum and the gear 1000 attached thereto falls below the speed of the driving pulley 1008 the pinions 1007 rotate on their own axes and impart increased speed to the gear 1005 which through the sleeve 1004 accelerates the speed of the pump. As the pump increases in speed its resistance increases at a ratio corresponding with the increase in driving power required by the drum to keep the tension uniform on the fabric, and in order to obtain the desired result this ratio must be such as may be stated by the following formula:—

Let R represent the radius of the drum, V the velocity of the pump and P the pressure at the outlet of the pump, then the gearing must be so proportioned that the increase in radius will produce a relatively smaller increase in velocity and a resultant increase in pressure equal proportionately to the increase in radius, thus:

|  | R | V | P |
|---|---|---|---|
| Minimum equals | 6 | 1 | 1 |
| Increase equals | 12 | 1.415 | 2 |

As the radius increases tension is prevented from decreasing by the fact that the gearing produces a predetermined increase in the speed of the pump and results in maintaining a constant tension of the fabric throughout the process of winding the roll from minimum to maximum diameter. In this manner the wind-up action is rendered constant in speed and tension.

This completes the detailed description of the machine, and in order to facilitate the ready understanding thereof, I will now set forth briefly the manner in which it is assembled, or, in other words, the relative arrangement of the parts.

The assemblage.

The dimensions of the machine, and in some cases of the rolls, depend upon the style of staple-lock fencing required. In the present case the fabric produced is for seven-strand fencing with the marginal strands having the ends of the stay-wires twisted around them. The frame of the machine is consequently of sufficient length to accommodate five pairs of the rolls 2 and 4 and two pairs of 10 and 12, the latter being right and left pairs and located at the right and left ends of the machine. The shaft 3 supports rolls 2 and 10, and the shaft 5 supports rolls 4 and 12. The shaft 3 is located at the top of the machine frame and shaft 5 beneath and in a plane extending rearwardly at an angle of 20° from the vertical axial plane of the shaft 3. These shafts are journaled in the end frames 255, 256 which are relatively braced by a heavy tie-beam 257 and a bar 258, or the machine frame may be otherwise constructed to meet requirements. The shafts are braced at each side of each pair of rolls 2 and 4 by the tie yokes on brackets 87 steadied on shaft 8 which is made comparatively heavy to enable it to sustain the strain of the lock-forming and stay-twisting operations in conjunction with the instrumentalities on the work-roll. The secondary rolls by which the various stages of the operations are completed, are arranged around the work rolls as follows: referring first to the rolls 2 and 10, the lock wire is fed across the machine in a plane extending at an angle of 32° from the vertical axial plane of shaft 3 considered in the direction of rotation, and this wire is initially acted upon by the cutting mechanism carried by roll 90 mounted on the shaft 91 journaled in the brackets 87. The axis of this shaft 91 is located in a plane approximately 8° in advance of the cutting plane of the lock wire, considered in the direction of rotation. The roll 131 which carries the mechanism performing the next step in the operation, namely the initial bending of the legs of the staple, is mounted upon a shaft 142 also carried by the brackets 87. The axis of this shaft is located in a plane extending at an angle approximately 20° in advance of the plane of the shaft 91 also considered in the direction of travel.

The stay-wire is fed across the work rolls 2 and 10 in a plane extending at an angle of approximately 116° from the vertical axial plane of the shaft 3 considered in the direction of travel. The mechanisms for further bending the legs of the staples to lock the stay-wire against the strands and for bringing the stay-wire into operating engagement with the twisting means, are mounted upon a shaft 70 carried by brackets 87. This shaft 70 is located in a plane 11° in advance of the fed stay-wire.

The shafts 91, 142 and 70 are located in their respective angular planes in an arc concentric to the axis of the shaft 3 and are not journaled in the end frame 255, their ends finishing in the last bracket 87 to the right of the machine. At the opposite end of the machine however they are extended through the end frame 256 and provided with a train of gears for driving purposes.

After the staples have been acted upon by the various instrumentalities arranged around the roll 2 concentrically thereto they are transferred to the roll 4 where they are acted upon by the folding rollers 270 and 271. The axial plane of the shaft upon which the roller 270 is mounted extends at an angle of 59° from the vertical axial plane of shaft 5 considered in the direction of rotation. In a plane 16° in advance of and concentrically to the roll 4 is located the axis of the stub-shaft upon which the roller 271 is mounted. The staple after passing these rollers is acted upon by the roll 325 mounted upon shaft 8. The ends of the shaft 8 are journaled in the end frames 255 and 256 and its axis is located in a plane 31° in advance of the axis of the roller 271 considered in the direction of travel of the strands.

*Operation.*

The assembled machine is prepared for operation by threading the strands through the coilers and around the rolls 2 and 4, the ends being attached as usual to the combined wind-up and tension roll, and the lock-wire and the stay-wire feeding mechanisms are charged. The machine is then started.

The first stage in the operation is the feeding of the strands, the lock-wires and stay-wire.

The second stage is the cutting of the lock-wire blank. When lengths of about two and three-quarters (2¾) inches of this wire have issued from each of the bushings 86 they are cut off by cutters 92 acting in shearing relation with the bushings, and as rotation of the work-rolls 2 continues these blanks are picked up by the lips 62 upon which they rest bearing against shoulders 69.

The third stage of the operation is the formation of the staple which is done as the rotation of the rolls continues, by the segmental plates 100 of rolls 90. These plates have a peripheral speed equal to that of rolls 2, and as the latter rotate from the point where the lock-wire is cut off to the intersection of a radial line through the centers of rolls 2 and 90, the edges of the plates enter the slots 64 in the tools carrying the lock blanks before them and forcing them into the chambers 63 the sides of which turn the ends of the blank outwardly thus forming it into a staple the legs of which protrude radially from the rolls 2. The continued rotation of the work-rolls causes these staples to be carried upwardly to the fourth stage and during their passage between these stages the legs straddle guiding plates 110 which maintain the staples in the chambers during this interval.

The fourth stage of the operation is the engagement of the strand wires by the staples, the legs of which are made to straddle the strands. At this point the staples are still guided by plates 110 and this engagement continues until the staple legs extend completely beyond the strands, after which and until the fabric is transferred to rolls 4 to have the staples converted into locks, the staples are held by the strands with their heads in the chambers 63.

The fifth stage of the operation is the bending forward of the legs of the staple. This is caused by rolls 131, the pins 130 of which traveling at double the speed of rolls 2 overtake the legs of the staples and bend them at right angles to their heads. (See Figs. 2 and 5.) During this bending action the strands and through them the staples are firmly held against displacement by the cams 135 pressing the strands against rolls 2.

The sixth stage of the operation is the cutting off of a stay-wire. This is affected by the cutting tool 151 impinging upon rolls 154 and severing the stay-wire. There is only one of these tools on the roll 150 and during each rotation of this roll a length equal to its circumference is severed, such length being pre-determined by the height of fence or width of fabric to be made, the length being sufficient to cover this height or width and have sufficient in addition at each end to be wrapped around the marginal strands.

The seventh stage is the picking up of stay-wire. This is done by rolls 2 through the staples and by the lifting tables 34 of rolls 10. As rotation progresses the cycloidal fingers 211 intermesh with rolls 10, and at the same time bear upon the ends of the stay and force them beneath the presser-feet 192 and into engagement with the hooks 186.

The eighth stage of the operation is the bending inwards of the legs to clasp the stay and have their ends within the pitch-lines of the rolls 2 thereby confining the stay upon these latter rolls and at the same time imparting to the ends of the stay an inclination to serve as a spiral lead. This is necessary in order to cause the wrapping of the stay ends around the marginal strands to extend downwardly or in other words to follow the stay. This bending inwardly of the staple ends is caused by the tools 166 intermeshing with the protruding ends of tools 60 and 61. Two essential relative positions of the bending tools 166 and tools 60 and 61 augment the strands in preventing displacement of the staples from the chambers 63, the first position presenting abutment face 167 of each tool 166 to the ends of the staple legs, and the second bringing the flanks of teeth 168 into bearing relation with and to slide inwardly over the anvils 65 and thereby bend the staple legs to above-mentioned positions.

The ninth stage of the operation is the twisting of the ends of the stay around the marginal strands and this operation occupies about 180 degrees of rotation of the rolls 2. This twisting of the stay ends is done by the hooks 186 driven by the train of gears commencing with segmental gear 179. The hooks are rotated counter-clockwise at the right hand side and clock-wise at the left and (as shown in Figs. 17 and 18), the ends of the stay are wound around the strand and pass beneath the stay between the lifting tables 34 and the marginal-strands. During this wrapping or twisting operation the twisted end will creep forwardly against the resistance of the presser-feet, the springs 195 being compressed and the slots 199 and 200 accommodating the movement. Immediately the twisting is finished the hooks and work-tables 177 are locked in position to receive the next stay by the cams 250 intermeshing with the concavities 252 in the locking disks 251; the locked condition being maintained until the ends of the next stay-wire are to be acted upon thereby to be twisted.

The tenth stage of the operation is the transfer of the fabric from rolls 2 to rolls 4. This takes place during progress of rotation of the rolls, and when the fabric reaches rolls 4 the staples are backed into dies 260 in which they are held by the tension of the strands with their legs protruding as shown in Fig. 11.

The eleventh stage of the operation is the bending of the legs of the staples across the strands; and this takes place during progression of the rotation by first the left leg of each staple coming into contact with roll 270 and then the right leg coming into contact with roll 271, and as they are drawn past these rolls they are bent alternately to the positions shown in dotted lines in Figure 14. This action results from the simple impingement of the legs on the rolls no independent operation of the latter being necessary. When this stage is completed the legs will appear in side view as illustrated in Fig. 13.

The twelfth stage of the operation is the formation of the staples into locks thereby completing the fabric, the tension on the strands remaining constant but additional tension being imparted to the stay. The compression of the staple with its legs folded takes place immediately the rolls 325 bring the matrices 300 into radial alinement, relatively to the rolls 4, with matrices 260, the cams 316 simultaneously coming into the same alinement and driving the plungers 263 outwardly, thus compressing and setting the locks. During this stage the compression is gradual and the folded legs are rolled from their irregular position shown dotted in Fig. 14 to the regular position shown in Fig. 16. This is brought about by the rolling of the folded legs into matrices 300 of rolls 325, the rises or teeth 303 of which and the sloping floor 307, 308, gradually setting the heads and folded legs of the locks and also gradually crimping the intersecting stays and strands until maximum pressure is exerted by the cams 316 through plungers 313 and 310. The stretching of the stays to sustain the crimping action of these dies is affected by the cycloidal faced fingers 501, and roll 12, which register with the right-hand walls and bear oppositely upon the portions of the stay-wires wrapped around the marginal strands and impart tension thereto in opposite directions.

The progressive rotation of the work rolls under the influence of the fabric drawn by the wind-up roll brings other lock blanks and stays successively into position and spaces them uniformly. During this period uniformity of tension is imparted to the fabric by the hydraulic governor, the governor itself being controlled by the tension of the wind-up roll, which without the governor would increase the tension proportionately as the diameter of the bundle increases. This variation of tension is automatically provided for by the governor as before described, the resultant pulling force on the fabric being constant. Different degrees of tension for different widths of fabric and different gage of wire are provided by adjusting the outlet valve of the pump.

What I claim is as follows:

1. In a rotary wire-fabric machine, the combination with means for causing the strand wire to travel through the machine, means for feeding a stay wire across the strand, and means for feeding a length of lock-wire to the point of intersection of the strand and stay wire; of a pair of work-rolls substantially equal in diameter constructed and arranged to successively act upon said length in the wrapping of the same around the strand wire and stay wire at their point of intersection.

2. In a rotary wire-fabric machine, the combination with means for causing a strand wire to travel through the machine, stay wire feeding mechanism, and a pair of work-rolls located in the same vertical plane; of a plurality of rolls of comparatively small diameter mounted in the machine frame and spaced around the peripheries of the rolls in the direction of rotation, said plurality of rolls being constructed and arranged to successively co-operate with the work-rolls in fastening the strand and stay wire together.

3. In a rotary wire-fabric machine of the ring-lock type, the combination with a pair of parallel shafts extending from end to end of the machine, a series of pairs of work-rolls mounted upon the said shafts, each pair being located in the same vertical plane, and both rolls of each pair being constructed and arranged to act directly upon their respective locks.

4. In a machine for manufacturing wire fabric of the ring-lock type, the combination with means for causing a strand wire to travel through the machine and means for feeding a stay wire across the strand; of rotary staple-forming mechanism; rotary means for folding the legs of the staple around the strand and stay wires at their point of intersection in ring-lock form; and rotary means for compressing the lock after the folding operation has been completed.

5. In a machine for manufacturing wire fabric of the ring lock type, means for causing a strand-wire to travel through the machine; means for forming a staple with its legs straddling the strand; means for bending the legs of the staple; means for feeding a stay-wire across the strand and between the same and the bent legs; means for further bending the legs; means for folding the bent legs; and means for compressing the folded staple and completing the lock.

6. In a rotary wire fabric machine, the combination with a work-roll and a fixed part in close proximity to the periphery thereof; of means for feeding lock-wire to the fixed part; a guide for the fed lock-wire extending from the feed mechanism to the said fixed part; and rotary means in shearing relation with the said fixed part and arranged to cut predetermined lengths from the fed-wire.

7. In a rotary machine for manufacturing wire fabric, the combination with a fixed part and lock-wire feeding mechanism; of rotary means for cutting predetermined lengths from the fed wire, said means consisting of a roll and a cutting tool mounted upon the roll and in shearing relation with the said fixed part.

8. In a rotary machine of the type described, the combination with a work-roll, of rotary combined lock-wire and staple-forming mechanism, said mechanism including a rotary cutter and a member movable in unison with the cutter and constructed and arranged to intersect the periphery of the work-roll.

9. In a rotary wire fabric machine, the combination with a work-roll and a fixed part in close proximity to the periphery thereof; of means for feeding lock-wire to such fixed part; rotary means in shearing relation with such part and constructed and arranged to cut predetermined lengths from the fed wire; and means adapted to move in unison with the cutting mechanism and co-act with the work-roll in forming the cut lengths into staples.

10. In a rotary machine of the type described, the combination of a work-roll having a circumferential groove; a fixed part in close proximity to the periphery of the roll and lockwire feeding mechanism; combined means for cutting predetermined lengths and forming the cut lengths into staples, said means consisting of a roll mounted independently of the work-roll; a cutter mounted upon one side of the roll and in shearing relation with the said fixed part, and a segmental plate mounted on the opposite side of the roll and in position to register with the circumferential groove of the work-roll.

11. In a wire fabric machine, the combination with a work-roll having a circumferential groove in its periphery and means for feeding lock-wire to the said work-roll, of a roll carrying a cutter constructed and arranged to cut predetermined lengths from the fed lock-wire, the periphery of said just-mentioned roll having a raised portion adapted to register with the circumferential groove in the work-roll for the purpose of forming the cut lengths into staples.

12. In a rotary machine for manufacturing wire fabric, means for causing a strand wire to travel through the machine, lock-wire feeding mechanism, means for cutting predetermined lengths from the fed wire, means for picking up the cut lengths and causing the same to travel in unison with the strand, and means constructed and arranged to form the picked-up lengths into staple-locks.

13. In a rotary machine of the type described, the combination with a work-roll, rotary staple-forming mechanism, and mechanism constructed and arranged to act upon the legs of the staple; of fixed means located in close proximity to the periphery of the work-roll and between the said mechanisms and constituting a guide for the staple during travel from one mechanism to the other.

14. In a rotary machine of the type described, the combination with a work-roll, rotary staple-forming mechanism, and mechanism constructed and arranged to act upon the legs of the staple; of fixed means located in close proximity to the periphery of the work-roll and between the said mechanisms, said means consisting of a guide member of plate-form one edge of which conforms to the periphery of the work-roll and is adapted to be straddled by the staple during travel of the latter from one mechanism to the other.

15. In a wire-fabric machine, the combination of means for causing progressive travel of the strands through the machine, means retaining hook-shaped staples in engagement with the strands with the legs of the staples straddling the strands and projecting transversely thereto; and means supporting stays in position to be picked up and carried by the staples.

16. In a machine for manufacturing wire fabric, the combination with a pair of rolls in contiguous tandem relation, of means on one of the rolls for partially forming the locks on the strands, and means on the other roll for continuing the formation of the locks on the strands, and means for transferring the strands and partially formed locks from one to the other of the rolls without displacement of the locks relatively to the strands.

17. In a rotary wire fabric machine, the combination with a work-roll having a pair of dies mounted thereon, said dies having a chamber; lock-wire feeding mechanism; means for cutting a predetermined length from the fed wire; means for forcing the cut length into the chamber to form a staple with its legs protruding therefrom; of means for bending the protruding legs of the staple at an angle to the remaining portion thereof within the chamber.

18. In a rotary wire fabric machine, the combination with a continuously rotating work-roll having a chamber in its periphery, said chamber being constructed and arranged to carry a staple therein with its legs protruding; of means rotating at a multiple of the speed of rotation of the work-roll and adapted to bend the protruding legs of the staple.

19. In a machine of the type described, the combination with a continuously rotating work-roll, of means for retaining a staple thereon, and means constructed and arranged to bend the legs of the staple, said last-mentioned means consisting of a roll mounted independently of the work-roll and in position to be straddled by the staple, and a lateral projection on each side of the roll adapted to engage the legs of the staple.

20. In a machine of the type described, the combination with a continuously rotating work-roll constructed and arranged to carry a staple thereon, means constructed and arranged to bend the legs of the staple, said last-mentioned means consisting of a roll the periphery of which is provided with a raised portion adapted to prevent displacement of the staple on the work-roll during the bending operation, said roll being mounted rigidly upon a shaft and a pair of disks located on opposite sides of the roll and having their faces provided with inwardly-facing annular guides, and a pin radially opposite the said raised portion and extending through the said disks, roll, and guides in position to engage the legs of the staple, and means for rotating said bending means at a greater speed than the speed of rotation of the work-roll.

21. In a machine of the type described, the combination with a work-roll, of means for retaining a staple upon the work-roll, a pin mounted independently of the work-roll, and means for revolving the pin at a greater speed than the speed of rotation of the work-roll for the purpose of bending the legs of the staples.

22. In a machine for manufacturing wire fabric, rotary staple-forming mechanism, rotary means for bending the legs of the staple at right angles to the latter, and rotary means independent of the said bending means for further bending the legs of the staple to form a lock.

23. In a machine of the type described, the combination with a work-roll; of means for retaining a staple upon the work-roll; means for feeding a strand wire to the work-roll in position to be straddled by the staple; means for bending the legs of the staple; means for feeding a stay-wire transversely to the strand and between the same and the bent legs of the staple; and means for further bending the legs of the staple for the purpose of locking the stay-wire upon the strand.

24. In a machine of the type described, the combination with a work-roll; of means adapted to retain a staple upon the roll; and rotary means mounted independently of the work-roll and constructed and arranged to intermesh therewith for the purpose of bending the legs of the staple back upon itself to form a lock.

25. In a rotary machine of the type described, means for causing the strand wire to travel through the machine, rotary means for feeding a stay-wire across the strand, and means carried by said rotary feeding means and rotatable in unison therewith for cutting a predetermined length from said stay wire.

26. In a machine of the type described, the combination of a work-roll having an anvil upon the work-roll; means for retaining a staple upon the roll in close proximity to the anvil; and rotary means mounted independently of the roll and having a radial projection on its periphery constructed and arranged to bear upon the anvil for the purpose of bending the legs of the staple.

27. In a machine of the type described, the combination with a circumferentially grooved work-roll having a radial chamber;

of a pair of dies mounted within the chamber with their ends protruding therefrom and having a vertical slot registering with the circumferential groove of the work-roll and adapted to receive a strand wire, the protruding end of one of the dies being beveled to present an anvil, and the protruding end of the other die being extended and rabbeted to present a lock-blank lifting member and a chamber, such chamber being constructed and arranged to receive the lifted blank for the purpose of forming the blank into a staple with its legs straddling the strand; and means co-acting with the anvil for bending the legs of the staple.

28. In a rotary machine of the type described, rotary combined stay-wire feeding and cutting mechanism, said mechanism consisting of a pair of continuously rotating feed rolls, said rolls being circumferentially grooved to receive the stay wire therebetween, and a cutting tool mounted on one of said feed rolls and adapted to co-act with the periphery of the other roll in cutting the stay wire.

29. In a machine for manufacturing wire fabric, rotary staple forming mechanism and rotary means independent of the said mechanism for folding the legs of the staples towards each other across the strands of the fabric.

30. In a rotary machine for manufacturing wire fabric, the combination with staple-forming mechanism having a work-roll adapted to retain the staple upon its periphery; of rotary means for folding the legs of the staple towards each other across the strands of the fabric, said last-mentioned means consisting of a pair of rollers mounted in the machine frame adjacent the periphery of the work-roll and having their axes radially disposed relatively to the latter.

31. In a rotary machine of the type described, the combination with a work-roll and means for retaining a staple on the work-roll, of rotary means for folding the legs of the staple, consisting of a pair of flat rollers located in close proximity to the periphery of the work-roll and disposed on opposite sides of the middle of the face thereof one slightly in advance of the other with their peripheries overlapping a portion of the said face.

32. In a rotary machine of the type described, the combination with means for forming a ring-lock, a work-roll constructed and arranged to carry the lock, and a radial plunger mounted thereon and in position to engage the lock, of a roll mounted independently of the work-roll and having a matrix mounted in its periphery, said matrix being constructed and arranged to co-act with the plunger in flattening the ring lock; and means for actuating the plunger.

33. In a rotary machine of the type described, the combination with means for forming a ring-lock; a work-roll having a central chamber and having a radial slideway extending from the chamber to its periphery; of means for flattening the ring-lock, consisting of a cam located within the chamber and retained against rotation by an arm secured to the machine frame, said cam having a rise radially opposite the slideway; a plunger mounted within the slideway and having a trundle roll mounted upon its inner end and constructed and aranged to ride upon the cam and a die upon its outer end; a roll mounted independently of the work-roll, a die mounted in the periphery of the roll and having a convex matrix face, the die upon the roll and the other die upon the plunger being adapted to co-act in flattening the ring lock.

34. In a ring-lock wire fabric machine, the combination of means for sustaining strands and stays in intersecting relation; means for partially forming a lock in engagement with each intersection; lock-forming mechanism; means for causing the fabric to travel through the machine during the manufacture thereof; and means for simultaneously completing the lock and crimping each intersecting strand and stay.

35. In a rotary machine of the type described, the combination with a work-roll having a central chamber and radial slideway; means coacting with the work-roll for sustaining strands and stays in intersecting relation; means for forming ring locks at the points of intersection; means for simultaneously compressing each ring lock and crimping the intersection points of the strands and stays, consisting of a cam located within the chamber and retained against rotation by an arm secured to the machine frame, said cam having a rise radially opposite the slideway; a plunger mounted within the slideway and having a trundle roll mounted upon its inner end and constructed and arranged to ride upon the cam; a die upon the outer end of the plunger; a roll mounted independently of the work-roll, a die mounted in the periphery of the roll and having a convex matrix face, the die upon the roll and the other die upon the plunger being adapted to coact in the simultaneous compression of the ring-lock and crimping of the strands and stays.

36. In a rotary machine of the type described, the combination with means for causing a strand wire to travel through the machine, means for feeding a stay-wire across the strand, and a work-roll; of means for twisting the end of the stay-wire around the strand, said last-mentioned means consisting of a gear mounted upon the work-roll having a central opening adapted to receive the strand, a hook upon the gear adjacent the opening and adapted to engage the end of the staywire to be twisted, and means for rotating the said gear during one-half of a revolution of the work-roll.

37. In a rotary machine of the type described, the combination with a work-roll and twisting mechanism mounted thereon; of means for rotating the said mechanism during one-half of a revolution of the work-roll, and means for preventing rotation of the said mechanism during the other half.

38. In a rotary machine of the type described, the combination with a work-roll, of rotary twisting mechanism carried by the work-roll, means for feeding a stay wire in close proximity to the twisting mechanism, and rotary means for forcing the stay wire into engagement with the said mechanism.

39. In a rotary machine of the type described, rotary twisting mechanism, stay-wire lifting mechanism, and rotary means for forcing the lifted stay-wire into engagement with the twisting mechanism, said means consisting of a roll located in close proximity to the twisting mechanism and a radial finger mounted in the periphery thereof, and having a cycloidal face adapted to engage the stay-wire.

40. In a machine of the type described, the combination with a work-roll having a circumferential groove in its periphery, a portion of such periphery being cut away and having a housing mounted therein; of twisting mechanism mounted in the said housing, said mechanism consisting of a twister gear, such gear and housing having a radial slot registering with the groove in the work-roll, a hook upon the twister gear adjacent the said slot, and means for rotating the said gear during 180° of the rotation of the work-roll, said last-mentioned means consisting of a fixed semi-gear, and gears effecting an operative connection between the twister-gear and fixed gear.

41. In a machine of the type described, the combination with a work-roll having a portion of its periphery cut away and a housing mounted therein; of twisting mechanism located within the housing, said mechanism consisting of a twister-gear having a hook; means for rotating the said gear during 180° of the rotation of the work-roll, consisting of a semi-gear centered upon the shaft of the work-roll and held in fixed position by being secured to the machine frame, a stub shaft mounted upon the work-roll, and gears upon the shaft effecting an operative connection between the semi-gear and twister gear; means for preventing rotation of the twister gear during the remaining 180° of the rotation of the work-roll, said last-mentioned means consisting of a semi-circular cam centered upon the shaft adjacent the semi-gear and a disk rigidly mounted upon the said stub-shaft, such disk having a concavity adapted to at times register with the periphery of the cam for the purpose of preventing rotation of the stub-shaft.

42. In a machine of the type described, the combination with a work-roll, means for causing a series of strands to travel through the machine, and means for feeding a stay wire across the strands, of means carried by the work-roll for twisting the adjacent end of the stay wire around one of the strands, and resilient means carried by the work-roll for retaining the end of the stay wire in engagement with the twisting means.

43. In a machine of the type described, the combination with a work-roll, means for causing a series of strands to travel through the machine, and means for feeding a stay wire across the strands, of means carried by the work-roll for twisting the adjacent end of the stay wire around one of the strands, and resilient means carried by the work-roll for retaining the end of the stay wire in engagement with the twisting means, said last-mentioned means consisting of a presser-foot carried by the work-roll and having relative movement thereon, a bracket on the work-roll, and a spring-bearing between the bracket and presser-foot.

44. In a machine of the type described, the combination with a work-roll having a portion of its periphery cut away and a housing mounted therein; a lifting table mounted upon the housing, means for feeding a stay-wire across the lifting table, of twisting mechanism located within the housing, said mechanism consisting of a twister-gear having a hook formed integrally therewith, and means for rotating the said gear one-half of a revolution of the work-roll, and means having a scope of operation extending between the lifting table and hook and constructed and arranged to bend the stay-wire for the purpose of bringing the same into engagement with the hook, the lifting surface of the said table being of sufficient distance above the twister-gear to provide the necessary clearance for the stay-wire end during the twisting operation.

45. In a machine for producing wire fabric, means for causing a plurality of strand-wires to travel through the machine, means for feeding a stay-wire across the strands, means for locking the stay-wire upon the strands, and means for stretching the stay-wire after it has been locked upon the strands.

46. In a fabric making machine, wind-up mechanism for the fabric comprising a drum and means for driving the drum; and automatic mechanism for governing the rotative power thereof consisting of pressure-fluid means having velocity the pressure being commensurate with the velocity and gearing operatively connecting the drum to the said pressure-fluid means.

47. In a continuously operating fabric-making machine constructed and arranged to continuously eject the finished fabric therefrom; wind-up mechanism adapted to continuously wind the ejected fabric, said mechanism consisting of a drum, a power-driven member, and a differential gear operatively connecting the power-driven member to the drum.

48. In a continuously operating fabric-making machine constructed and arranged to continuously eject the finished fabric therefrom; wind-up mechanism adapted to continuously wind the ejected fabric, said mechanism consisting of a drum, a power-driven member, a differential gear operatively connecting the power-driven member to the drum; a yielding resistance consisting of a rotary pump including a valve-controlled duct and a pair of intermeshing gears; and means operatively connecting the differential gear through one of said intermeshing gears.

49. In a continuously operating machine, wind-up mechanism for the product of the machine comprising a continuously rotating drum; a rotary power-driven member; an internal gear rigidly fastened to the drum, a spur gear within and concentric with the internal gear; and pinions carried by the power driven member and adapted to revolve therewith in a path intermediate and in mesh with the gears.

50. In a fabric making machine, wind-up mechanism for the fabric comprising a continuously rotating drum; a power-driven member in the form of a belt-drum pulley rigidly fastened to the drum, a spur gear within and concentric with the internal gear; and pinions carried by the power-driven member and adapted to revolve therewith in a path intermediate and in mesh with the gears.

In testimony whereof I have signed my name to this specification in the presence of two witnesses.

ARTHUR E. BLASHILL.

Witnesses:
GORDON G. COOKE,
WILLIAM HEWETSON.